Aug. 15, 1972   K. E. SAGER   3,684,604
METHOD AND APPARATUS FOR MAKING BIAS REINFORCED MATERIALS
Filed April 27, 1970   4 Sheets-Sheet 2
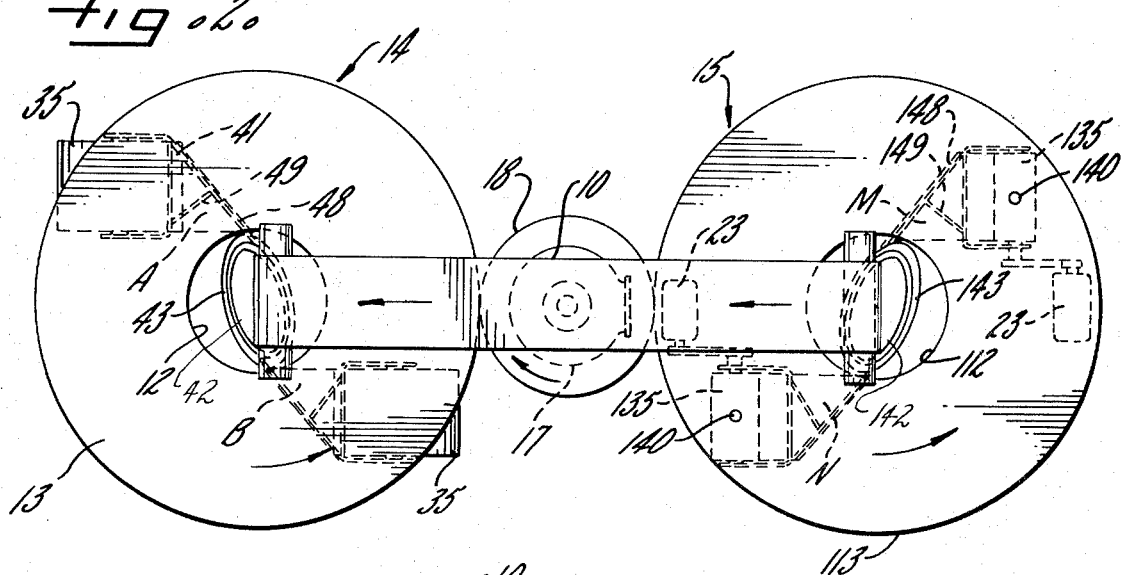
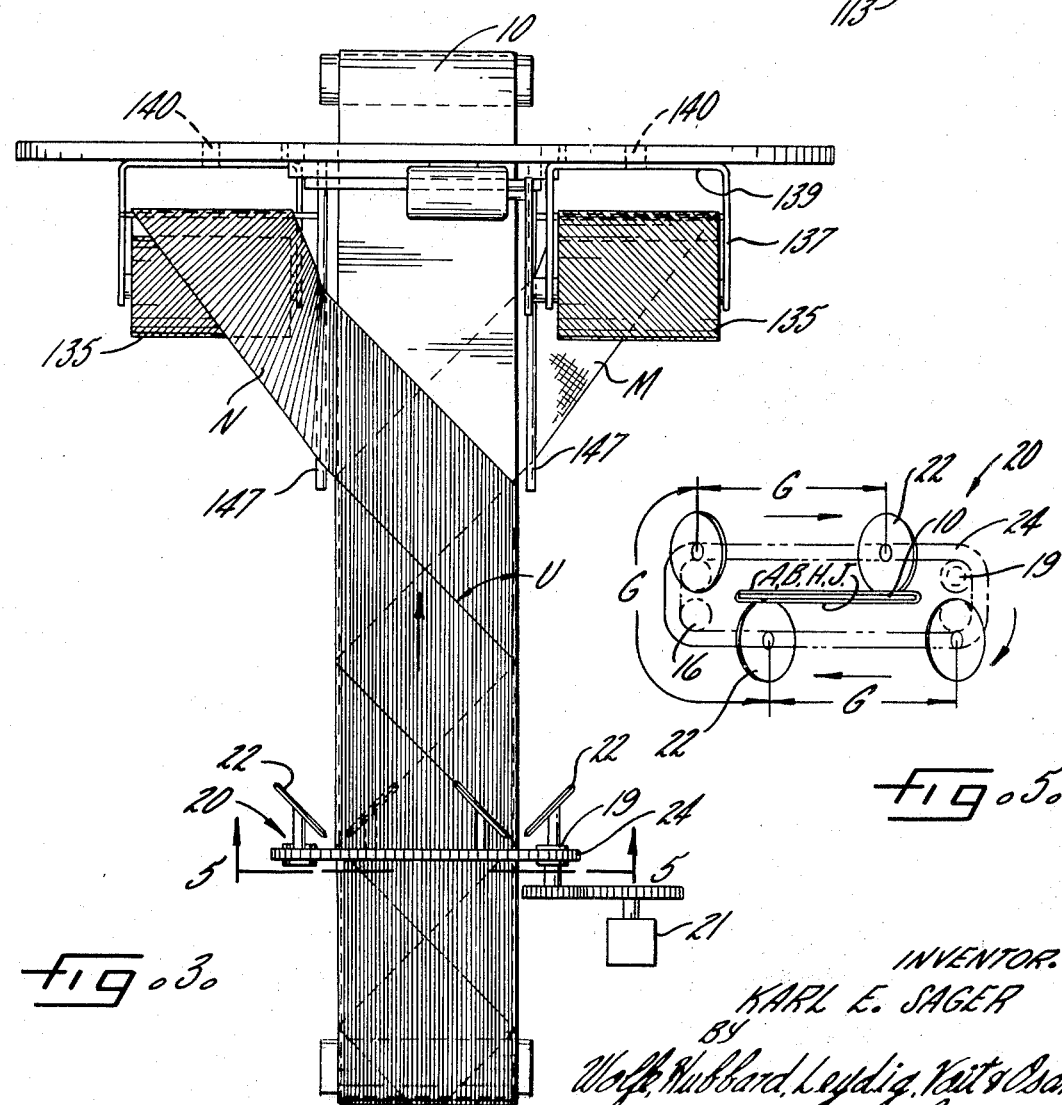
INVENTOR.
KARL E. SAGER
BY
Wolfe, Hubbard, Leydig, Voit & Osann
ATTORNEYS.

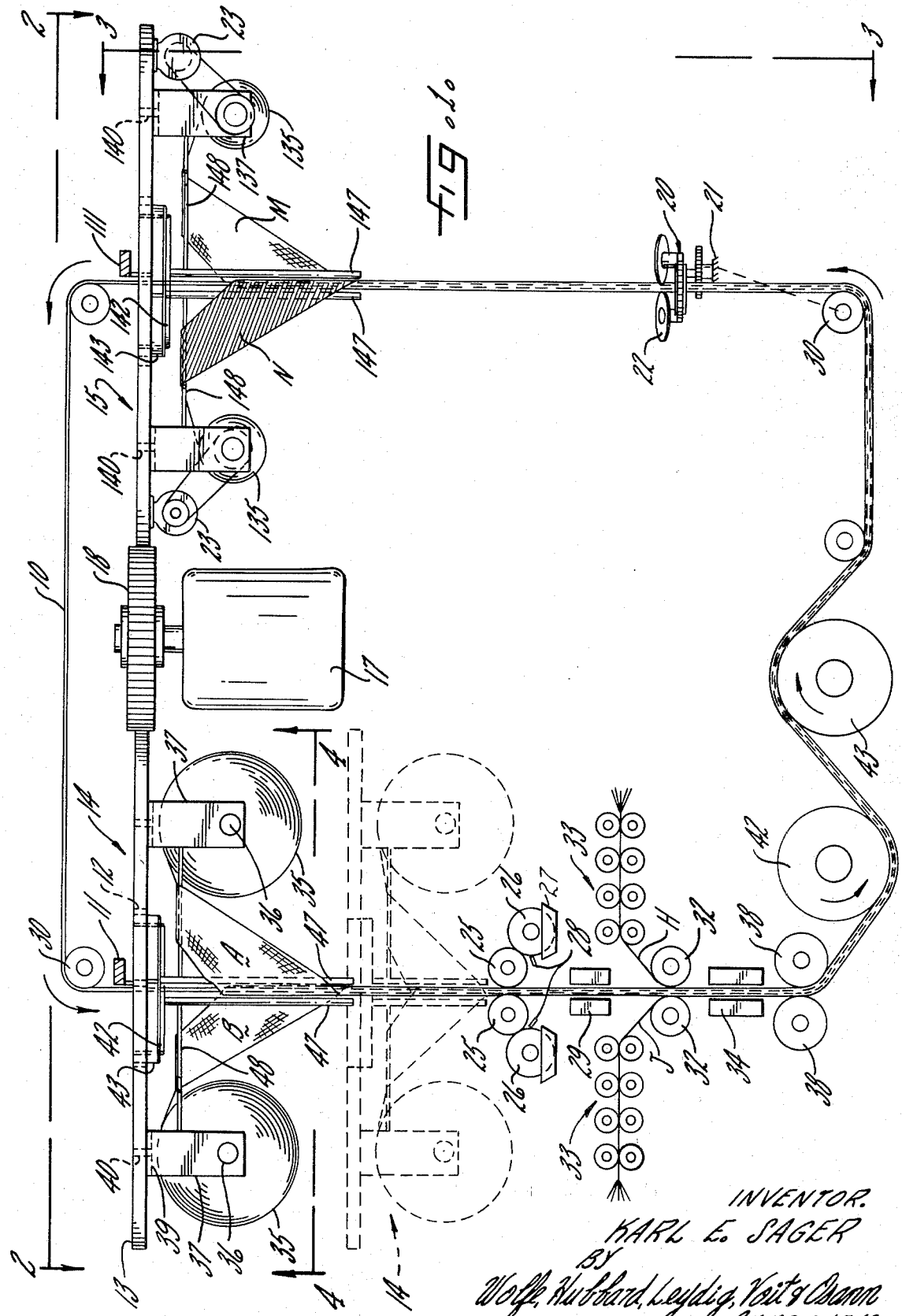

Aug. 15, 1972    K. E. SAGER    3,684,604
METHOD AND APPARATUS FOR MAKING BIAS REINFORCED MATERIALS
Filed April 27, 1970    4 Sheets-Sheet 3

INVENTOR.
KARL E. SAGER
BY
Wolfe, Hubbard, Leydig, Voit & Osann
ATTORNEYS.

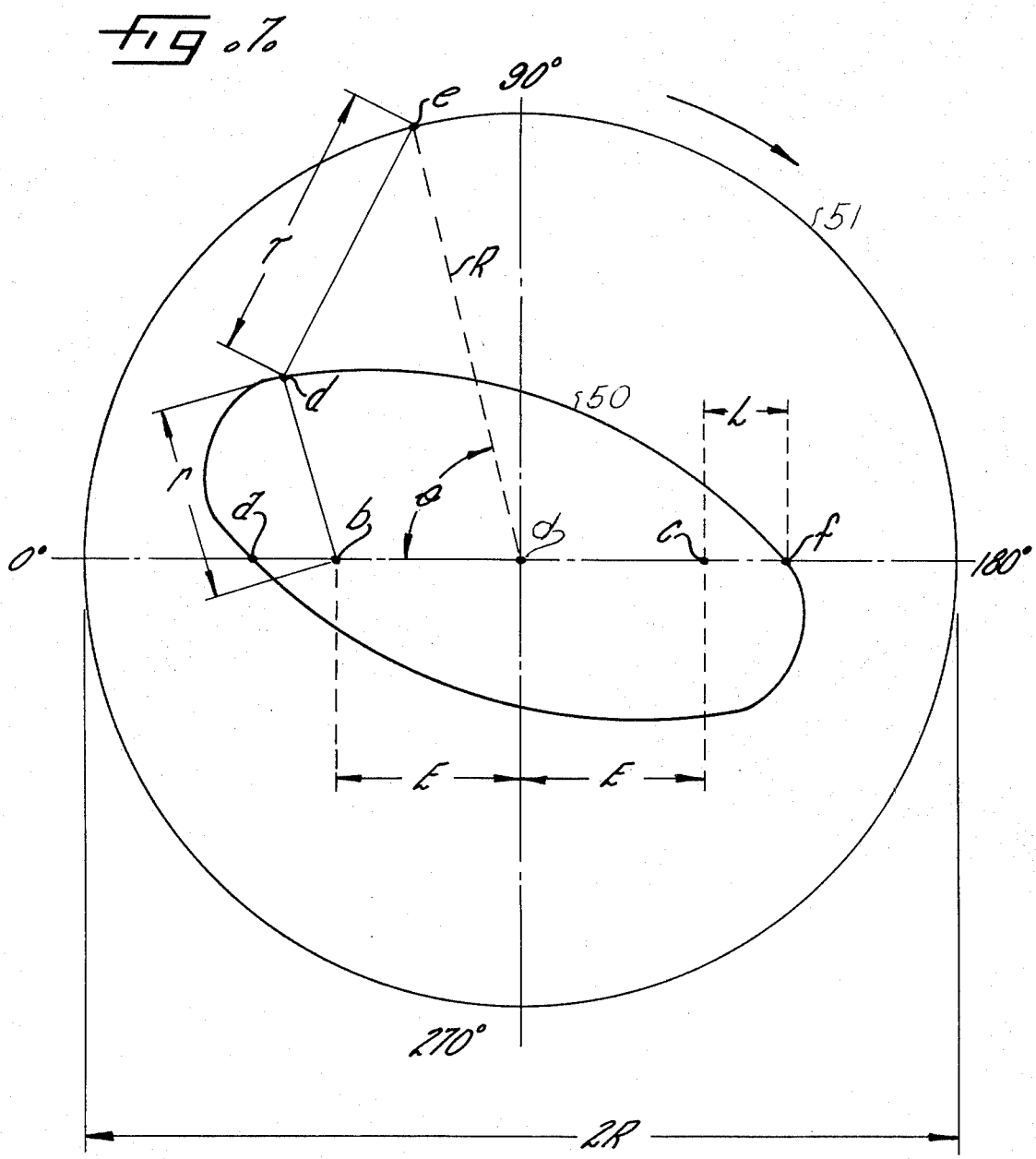

United States Patent Office 3,684,604
Patented Aug. 15, 1972

3,684,604
METHOD AND APPARATUS FOR MAKING
BIAS REINFORCED MATERIALS
Karl E. Sager, Appleton, Wis., assignor to Kimberly-Clark Corporation, Neenah, Wis.
Filed Apr. 27, 1970, Ser. No. 31,973
Int. Cl. B65h 81/00
U.S. Cl. 156—171                                        25 Claims

ABSTRACT OF THE DISCLOSURE

Bias reinforced materials such as nonwoven fabrics are made by helically wrapping a first ply about a continuously moving carrier belt, placing a second ply longitudinally along the belt over each side of the helical wrapping, bonding the plies, cutting the second ply along lines adjacent the edges of the first ply, and unwrapping the first ply with the second ply bonded thereto.

CROSS-REFERENCE TO RELATED APPLICATIONS

Riese et al. Ser. No. 622,187, now U.S. Pat. No. 3,510,-382; Riese Ser. No. 674,187, now U.S. Pat. No. 3,533,-882.

BACKGROUND AND OBJECTS

This invention relates to method and apparatus for making bias reinforced materials, and more particularly concerns the manufacture of multi-ply web products having at least one reinforcing ply at an angle transverse to the machine direction.

While the present invention has applicability to the manufacture of numerous types of products of widely different compositions and characteristics, it will be described with reference to the field of nonwoven fabric or textile products.

Nonwoven fabrics, composed of natural or synthetic polymeric fibers bonded together into a paper-like mat, are now of widespread use in the manufacture of disposable clothing. While nonwoven fabrics possess advantageous characteristics for many purposes, a limitation of many such fabrics is their relatively low tensile strength in directions transverse to the direction of primary fiber alinement. For this reason, it is customary to reinforce nonwoven fabrics by utilizing reinforcing scrim threads laid transversely to the fabric machine direction, or to employ a second nonwoven ply bonded to the first in a bias or transverse direction. These reinforced fabric webs thus combine the attractiveness and low cost of nonwoven webs with much of the strength of woven fabrics.

Methods and apparatus for making bias reinforced webs have become well developed, and are satisfactory for most purposes. Usually, however, these require that the base web, before application of the bias or reinforcing ply, be sufficiently strong in the machine direction so as to permit processing by automtic machinery. A principal object of the invention is to provide a bias apparatus and method which does not require that the foundation web or ply have substantial strength or be self-sustaining.

An associated object is to provide a method and apparatus for making bias reinforced materials in which sliding friction between the foundation or base ply and components of the machine, and tension exerted on the base ply before lamiation, are minimized or eliminated.

A further object is to provide a versatile method and apparatus which are capable of accommodating materials of different types, of providing one or several reinforcing plies, of laying these plies at a variety of pre-selected angles, and of permitting the use of widely different bonding techniques. In keeping with this object, an ancillary object is to provide a method and apparatus for making bias reinforced materials continuously, rapidly, and at low cost.

Still another object is to provide apparatus for making multi-ply reinforced nonwoven fabrics, which apparatus has low manufacture and operating cost, and is characterized by compactness, simplicity, and durability.

Yet a further object is to provide a method and apparatus for making bias reinforced materials where there is substantially no visible overlap of the reinforcing ply, and where the reinforced material is strong, durable, and attractive. A related object is to provide a bias reinforced material having no fiber joints in the machine direction.

Still further, another object of the invention is to provide a system for making bias reinforced materials in which the reinforcing angle or angles may be pre-selected within an illustrative range of about 30 to about 60° from the machine direction.

Other and further aims, advantages, and objectives of the invention will become apparent from the description as it proceeds in conjunction with the annexed drawings.

BRIEF DESCRIPTION OF DRAWINGS

FIG. 1 is a front elevational view of an apparatus embodying the invention;

FIG. 2 is a top plan view of the apparatus of FIG. 1 indicating the relationship of the feed platform 14 and the take-off platform 15;

FIG. 3 is an enlarged side view of the take-off platform 15 and the web-cutting device 20;

FIG. 5 is a schematic top view, taken along the lines 5—5 of FIG. 3, of the web-cutting device 20; FIG. 7 is a diagram showing the paths of travel of the supply and take-off rolls and of the vertical web guides.

Figure 4:
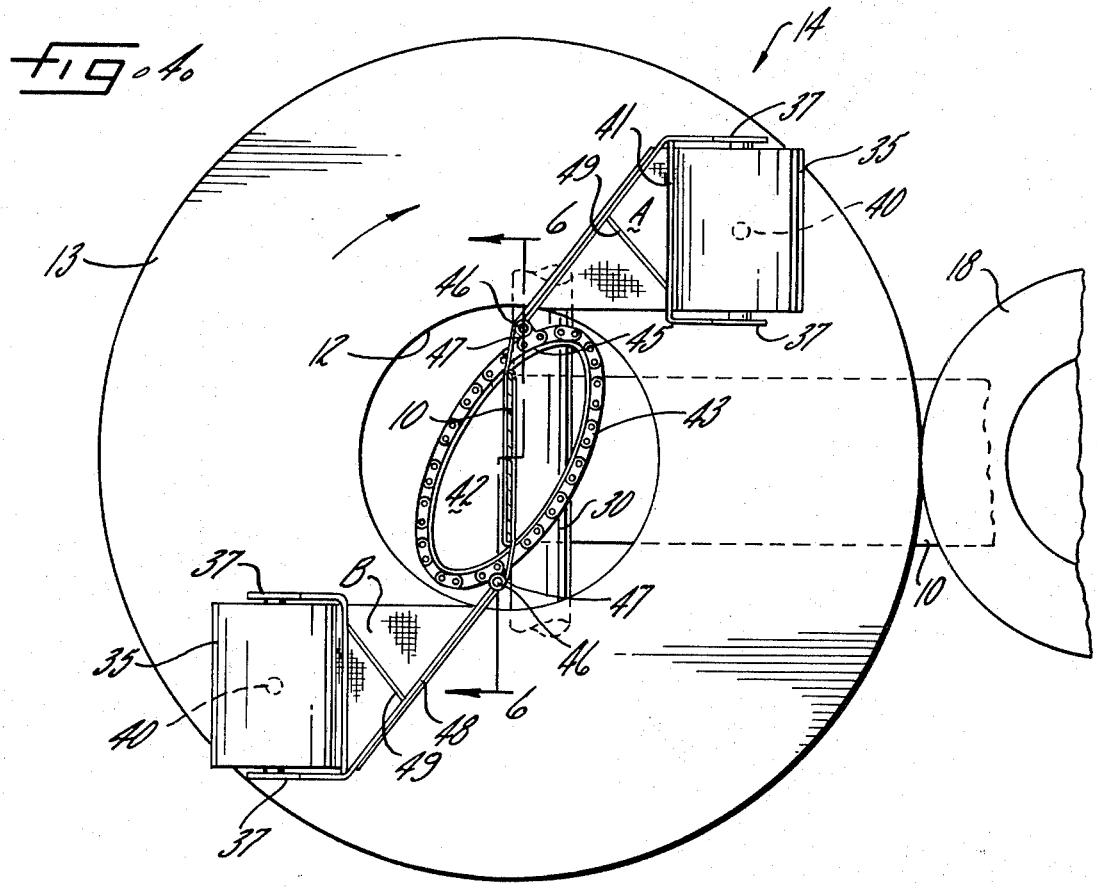
FIG. 4 is an enlarged bottom view of the feed platform 14 depicting the operation of an oval cam 42.
Figure 6:
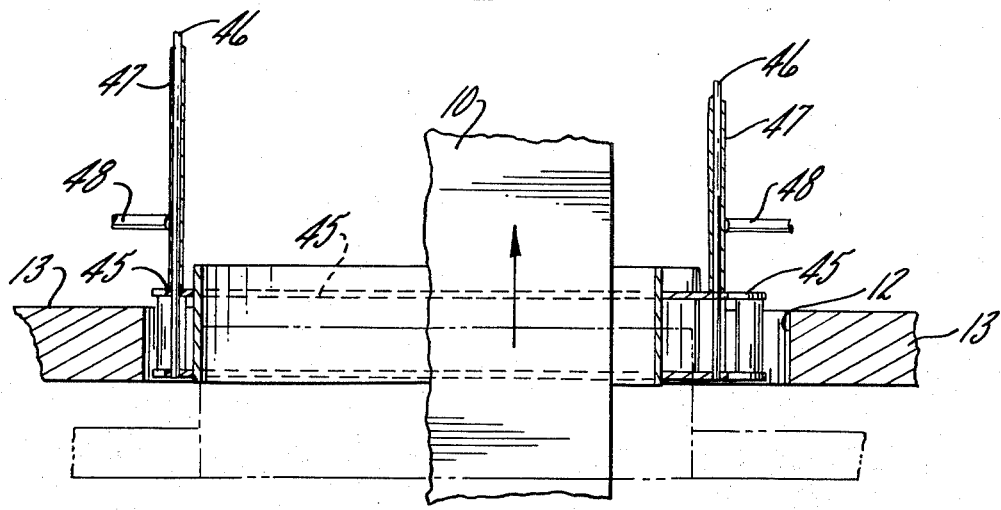
FIG. 6 is a further enlarged partial sectional view, taken along lines 6—6 of FIG. 4, depicting, in an inverted view, the central area of the feed platform 14 and take-off platform 15.

While the invention is susceptible of various modifications and alternative forms, certain specific embodiments thereof have been shown by way of example in the drawings and will be described in detail herein. It should be understood, however, that it is not intended to limit the invention to the particular forms disclosed but, on the contrary, the intention is to cover all modifications, equivalents, and alternatives falling within the spirit and scope of the invention.

DETAILED DESCRIPTION

Turning first to FIG. 1, a front elevational view of a cross-laying apparatus according to the invention, the apparatus includes a generally flat, continuously moving, carrier belt 10 traveling down through a feed platform 14 where the belt 10 is helically wrapped with one web A, B of nonwoven fabric, then through a station 33 where a second web is applied and bonded to the wrapped belt 10 parallel to the direction of belt movement, then carried through a web-cutting device 20 to cut the web substantially along lines adjacent to the edges of the first web A, B, and finally through a take-off platform 15 where the first web is unwrapped from the belt.

As best shown in FIGS. 1 and 4, the feed platform 14 includes a rotatable table 13 surrounding the belt 10, and provided with a circular central opening 12 through which the carrier belt 10 travels. The table 13 includes one or more supply rolls 35 which serve the base or foundation web onto the flat carrier belt 10.

In FIGS. 1 and 4, as in the remaining figures, duplicated elements have been designated with identical numbers for convenience and clarity of description. For the same reason, and as may be seen in FIGS. 1 and 2, where an element on the take-off platform 15 performs the identical function to a similar element on the feed platform 14, or else performs a diametrically opposite function, that element on the take-off platform 15 has been designated by an identifying numeral which is one hundred plus the numeral associated with the corresponding element on the feed platform 14. Thus, by way of illustration, the counterpart of the supply rolls 35 on the feed platform have been designated as the take-off rolls 135 on the take-off platform 15.

Turning once again to FIGS. 1 and 4, each of the supply rolls 35 is pivotally mounted on a generally U-shaped frame including a pair of upright standards 37 and a bridging part 39. For reasons which will be clarified presently, the bridging part 39 is journaled to the rotatable table 13 with a stud 40 passing through the table and including suitable bearings to permit the assembly to pivot freely about the stud 40.

Nonwoven fabric or other sheet material is withdrawn from the feed roll 35 and served onto the carrier belt 10 by a serving mechanism including a guide bar 41, a bracing bar 49, a second guide bar 48, and an upstanding sleeve 47. This assembly of the bars 41, 47, 48, and 49 is secured to the supply roll standards 37 at one end and, at the other end, to a shaft 46 journaled in a hinge link 45 mounted on a chain 43.

An advantageous feature of the present apparatus, described earlier in Riese application Ser. No. 674,187, is the provision of linkwork to insure that the foundation ply A, B served from the feed rolls 35 onto the flat mandrel-like carrier belt 10, is laid helically around the belt at a constant rate and at substantially constant tension. This occurs even though the belt 10 is flat whereas the feed rolls 35 orbit in a circular path on the rotatable table 13 because of the design of the cam 42. With a similar cam 142 on the take-off platform 15, the web is withdrawn or unwrapped from the carrier belt 10 at a correspondingly equal rate and at substantially constant tension, again notwithstanding the fact that unwrapping is accomplished from a non-round belt or mandrel.

As best shown in FIG. 4, an oval cam 42 is mounted within a circular opening 12 in the rotatable table 13. An articulated endless belt or chain 43 travels around the cam 42, and carries a hinged link 45 associated with each second guide bar 48. Where two or more rolls 35 are used, there correspondingly are provided an equal number of hinged links 45 on the chain 43, each associated with a corresponding feed roll 35. As the table 13 rotates about an axis coincident with the center of the belt 10, the cam 42 remains in position. However, since the second guide bars 48 are journaled onto the hinged links 45, and the links 45 are correspondingly constrained along a path governed by the shape of the cam 42, the bars 41, 48, 49, and the associated standards 37, pivot around the studs 40 so as to follow the cam 42. Consequently, the entire feed assembly of roll 35 and the like rocks from side to side about the stud 40 as the table 13 rotates.

Through this rocking or swinging action of the feed rolls 35 and their associated guide or serving bars, the webs A, B leaving the rolls 35 leave the rolls at a constant speed irrespective of the angular position of the table 13. In other words, even though the linear distance from the stud 40 to the belt 10 necessarily changes as the feed rolls 35 are rotated circumferentially around the mandrel or belt 10, the cam 42 and its associated chain 43 maintains constant the distance which the webs A, B must travel from the feed rolls 35 to the belt 10 at all positions of the table 13. This not only assures that the webs A, B leave the rolls 35 at an invariant rate, but provides uniform and equal tensile winding of the webs around the belt 10.

A similar arrangement of a fixed oval cam 142 (FIGS. 1 and 2) and associated chain 143 on the take-off platform 15 accomplishes the same result as the corresponding cam 42 and chain 43 on the feed platform 14. That is, the web M, N is withdrawn at a constant rate by maintaining constant the distance the web must travel between the belt 10 and the take-off rolls 135 irrespective of the actual distance between the central pivots 140 of the rolls 135 and the belt.

As indicated earlier, the pivots 40 for the feed roll assembly are desirably located centrally, that is, in line with the center of gravity of the feed roll assembly. Correspondingly, the pivots 140 associated with the take-off rolls 135 are also advantageously located centrally, except that in this latter case allowance is desirably made for the added and off-center weight of pulleys or other drive mechanisms which couple motors 23 to the take-off rolls 135. By employing such central mounting, inertia effects caused by the swinging or rocking of the feed and take-off rolls are minimized.

Turning to FIG. 7 and preserving attention to FIG. 4, there is presented a geometric sketch depicting the relationships among the oval cam 42, the circular path followed by the stud 40, and the structure coupling the feed rolls 35 to the hinged links 45. A similar relationship exists for the take-off platform 15, components (FIGS. 1 and 2).

On FIG. 7, the circle 51 corresponds to the circular orbit of the stud 40 (FIG. 4), and the oval 50 corresponds diagrammatically to the oval path of the shaft 46 on the hinged link 45. The distance T on FIG. 7 corresponds to the straight-line distance between the stud 40 and the shaft 46 of FIG. 4, while the distance E, terminated by points $b$ and the center $d$ or $c$ and the center $d$, equals one-half the width of the moving carrier belt 10 (FIG. 4).

The curve defined by the path 50 is, broadly, an oval inclined at an angle with respect to the plane of the belt 10 (FIG. 4), that is, line $bc$. Its characterizing feature is that the distance $r$, or line $bd$, increases proportionately with the movement of a point $e$ around the circumference of the path 51. Otherwise stated, the sum of distance T plus distance $r$ increases uniformly as the point $e$ moves around the circular path 51 for half of the circle, and then decreases uniformly as the point $e$ moves around the remaining half.

The path 50 therefore is a symmetrical curve on which any point $d$ is located a distance $r$ from a point $b$ that increases in proportion to the angle traversed by the movement of point $e$ as it travels about the path 51.

On the diagram of FIG. 7, the radius R of the path 51 is a constant and is chosen in the design of the rotatable table 13. Similarly, the length T is a constant, and as explained earlier is the linear distance between the center of the pivoting stud 40 and the center of the shaft 46 (FIG. 4). By the same token, the distance $bc$, corresponding to twice the length E is the width of the carrier belt 10 (FIG. 4).

To generate the path 50, a clearance length L is first chosen. This may be equal to zero, or any dimension less than R minus E such that the path 50 always remains within the circular path 51. The length L is then added to either side of the line passing through the center of the circle D and the belt-defining points $b$ and $c$. As shown on FIG. 7, point $a$ to the left of $b$ and point $f$ to the right of $c$ are marked.

Next, the angle $\theta_0$ is computed from the following equation:

$$\cos \theta_0 = \frac{(E+L)^2 + R^2 - T^2}{2R(E+L)} \quad (1)$$

The angle $\theta_0$ is the angle between the line $abDcf$ and a line $eD$ when point $d$ is at position $a$ on the path 50.

The next step in generating the path or curve 50 is to draw a line $eD$ at the angle $\theta_0$ from line $abDcf$. Then, an equal number of increments, illustratively every 15°, is marked off around the path 51 between the angle $\theta_0$ and the angle $\theta_0 + 180°$.

It will be apparent, therefore, that the distance $r$ between points $d$ and $b$ is at a minimum when point $d$ is at point $a$, and is a maximum when the point $d$ is at point $f$. Since the distance $r$ must increase uniformly as the point $d$ travels from $a$ to $f$ along the path 50, the incremental extension of $r$ must be proportional to the movement of the points $e$ around the circular path 51 from angle $\theta_0$ to $\theta_0 + 180°$.

Consequently, the same number of increments that was selected to divide the 180° angle is chosen to divide the difference between L (when $r$ is at a minimum) and $2a$ plus L (when $r$ is at a maximum). In other words, at any point along the path 50, the length $r$ is defined by the equation $$r = L + 2E\left(\frac{\theta - \theta_0}{180°}\right) \quad (2)$$

The two equations (1) and (2) completely define the path 50.

As noted earlier, the first point on the path 50 is the point $a$, and the last is the point $f$. To locate each intermediate point, in succession, the point $e$ is marked on the path 51 at the first increment after angle $\theta_0$, and an arc is drawn at a radius T about the point $e$. Another arc is drawn from the point $b$ at a distance equal to the first incrementally increased length $r$ (as determined from Equation 2). The left intersection of these two arcs is the next point on the path 50.

The procedure is repeated for each successive increment between angle $\theta_0$ and angle $\theta_0 + 180°$. A smooth curve may then be drawn to connect the points between point $a$ and $f$. To generate the bottom half of the path 50, that is, that portion of the path 50 below the 0–180° line, either the above procedure may be repeated or the first half of the curve merely rotated by 180° and duplicated.

The resulting path 50 is therefore a curve in which the distance $r$ increases in proportion to the angular movement of the point $e$ about the circular path 51 as the point $e$ moves around the path. Also, since the distance T is constant, the sum of T plus $r$ will likewise increase uniformly and linearly as the point $e$ moves around the path 51. Therefore, since T plus $r$ corresponds to the distance a fabric web A, B travels as the feed roll 35 orbits around the mandrel or belt 10 (FIG. 4), the distance the web travels from the roll 35 to the belt 10 increases and then decreases uniformly as the roll 35 circumnavigates the belt. And, since the roll 35 is orbiting at a constant rate, the fabric web A, B is being withdrawn from the web 35 at a constant linear rate.

One additional feature is necessary to insure the above relationship. As may be noted from FIG. 4, the hinged link 45 spaces the center of the shaft 46 a distance away from the cam 42. Thus, when using the procedure of FIG. 7 to design the cam 42, it is necessary to make the cam 42 smaller than the path 50 so that the center of the shaft 46 traces the desired path 50.

Returning again to FIGS. 1, 2, and 4, it is apparent in view of the above description that the webs A, B leaving the feed rolls 35 are carried around the guide bars 41 and 49 and then around the sleeve or serving bar 47 to present the webs to the moving belt 10 in a vertical plane. Also, the webs A, B are presented at a constant linear rate. Thus, as the belt 10 travels in the direction indicated in FIG. 1, rotation of the feed platform 14 about its base 11 and about an axis central of the belt 10 (FIG. 4) causes the webs A, B to be wrapped uniformly and helically around the belt. Advantageously, the rotation rate of the feed platform 14 is so chosen that there is essentially no overlap between adjacent edges of the webs A, B, although this is not essential and, indeed, where a multi-ply product material is desired, it may be desired to effect several layers of wrapping around the belt.

After leaving the feed platform 14, the belt with wrapped fabric passes to a pair of rotogravure rolls 25 wherein an adhesive is applied to the outer layer of the wrapped web. The rotogravure rolls 25 may either apply the adhesive as a continuous sheet or else may be patterned, applying the adhesive as spaced zones or in connected or un-connected lines or other patterns. Adhesive is applied to the rotogravure rolls from feed rolls 26 obtaining adhesive from pans 27, and from which excess adhesive is removed by doctor blades 28.

The adhesive, which is used to bond the wrapped web A, B to additional material H, J, may be any of the available adhesives suitable for the material constituting the final product. Where the adhesive is a thermoplastic material, or is otherwise heat-activated, a heater 29 surrounding the wrapped belt 10 pre-heats the adhesive and underlying web to present an active bonding surface to the wrapped web as it enters the station where a second component material is applied to the wrapped web in a direction parallel to the direction of belt movement.

In the exemplified embodiment, this second station comprises a series of drafting rolls 33 which function to aline the fibers constituting the web H, J in a direction parallel to the belt 10. Thus, in keeping with well known drafting or carding practice, the rolls move at progressively higher speeds in order to pull and thereby aline the fibers as they pass through the paired rolls. The resulting webs H, J leave the draw frame 33 and are applied on opposite sides of the wrapped belt 10, being pressed in position by nip rolls 32, which are resilient calender rolls utilizing the combination of pressure and heat to bond the two materials together.

If desired, a set of auxiliary heaters 34 succeed the nip rolls 32 and further heat and activate the adhesive before the combined web passes through an additional pair of calender rolls 38.

Depending on the adhesive, and particularly on its heating and bonding characteristics, it may be desirable to either further heat the web or else cool the web before the web is cut by a web-cutting device 20. In this event, a pair of heating or cooling drums 42, 43 may be installed in the belt circuit so that the belt is wrapped around a portion of each drum, first on one side and then on the other, to effect the desired heating or cooling. The drums may be provided with a heating medium or a cooling medium, depending on the desired temperature change necessary to cure or condition the adhesive.

After leaving the drums 42, 43, the web 10 has a helically wrapped layer immediately adjacent the web material and a second, bonded, layer on either side of the first one and bonded to the helical layer. In this condition, the belt 10 is presented to a web-cutting device 20 which is synchronized by appropriate gearing 21 to one of the belt drive rolls 30.

Referring primarily to FIG. 3 but maintaining attention to FIG. 1 for orientation, the web-cutting device 20 includes a plurality of uniformly spaced cutting rollers 22, located on a chain belt 24 (see also FIG. 5) and arranged to cut the webs parallel to the edges of the original webs A, B, and optimally at or near the edges of the original webs. The cutting, of course, is transverse to the direction of the longitudinally applied webs H, J, and thereby permits the original webs A, B to be un-wrapped from the belt 10.

As shown best in FIG. 5 and FIG. 3, the cutting rollers 22 travel across the belt 10 in a path that is parallel to the belt 10 when the rollers 22 are in contact with the moving belt. Thus, the gearwork mechanism 21 (FIGS. 3 and 1) insures that cutting of the wrapped belt 10 takes place along the desired edges of the original webs A, B. Advantageously, a drive roll 19 linked to the gears 21, and three rolls 16 establish a rectangular path for the chain 24 and for the four equally spaced cutting rollers 22 so that one roller is always in contact with each side of the belt 10.

Although physical cutting by cutting rollers 22 has been described, any other severing technique may be used, depending upon the nature of the materials constituting the webs A, B, H, J. For example, a fine cone of hot gas or flame may be used to cut synthetic filaments and fibers quite effectively. A series of high-speed cutting discs closely spaced from the belt surface will provide an extremely clean cut. Alternatively, helical knives mounted on carrier rolls to shear the web by pressing against the carrier belt 10, particularly when the belt 10 is a non-resilient material such as stainless steel, or solvent jets, hot knives, or water or air jets may be used to either weaken or sever the web.

By changing the angle of the cutting rollers 22 and the rate of transverse movement across belt 10, the webs carried by the belt can be slit along a line not parallel to their edges and different than the original angle of deposition of webs A and B. This permits manufacture of materials reinforced in various bias directions as described later.

In the final step of the inventive process, the original webs A, B are effectively un-wrapped from the carrier belt 10 at a takeoff platform 15. The platform 15 is constructed similarly to the feed platform 14, except that drive motors 23 are provided on the rotatable table 113 to power the takeoff rolls 135. Thus, the bonded and reinforced webs M, N are removed from the carrier belt 10 at a constant rate, and thus provide a bias reinforced two-ply web material.

In the depicted embodiment, the initial webs A, B are laid onto the carrier belt 10 as helicies having an angle of 45° with respect to the carrier belt, and the feed platform 14 and takeoff platform 15 are rotated at the same speed via a drive motor 17 and a drive wheel 18 to permit the product webs M, N to be withdrawn at the same 45° angle. As a result, the product webs M, N are bias reinforced with one layer of reinforcing material at a 45° angle longitudinally to the machine direction of the webs M, N.

When it is desired to utilize the principles of the invention to incorporate one or more additional reinforcing plies onto the product webs M, N, either or both of two alternatives may be employed. First, as indicated by the phantom lines 44, an additional feed platform 14 may be installed on the carrier belt 10 circuit to wrap an additional helical ply of fabric or similar material around the carrier belt, either in a direction opposite from that of the feed platform 14 or, in the same or opposite direction, at a relatively different speed than employed for the feed platform 14. Thus, in this event the product webs M, N will contain two reinforcing plies transverse to the longitudinal or machine direction, and each at a different angle with respect to the machine direction.

Alternatively, the product webs M, N, after substantially filling up the rolls 135, may be transferred from the takeoff platform 15 to the feed platform 14 and re-introduced into the apparatus as a new supply roll 35. Thus, an additional bias reinforcing ply may be applied to the product webs M, N by unwinding these product webs from the feed platform 14, helically wrapping the webs M, N about the belt, and repeating the application of an additional reinforcing ply longitudinally of the belt 10 as described earlier in conjunction with webs H, J.

Each of the product webs M, N may be doubled over longitudinally, or else the two webs bonded face to face, to form a criss-cross bias reinforced composite material that is four plies thick. Additional adhesive, heating, and/or pressure may be applied in this final assembly step. A particular advantage of either doubling over the product webs M, N or bonding the respective webs to each other is that the criss-crossed reinforcing elements may be placed internally of the plies (where this is desired) to afford a product in which the external fibers are aligned in the machine direction.

Various other product combinations are possible with the system of the invention. For example, a tissue web with a diagonal reinforcing layer on one side, made as described above, may be fed through the process a second time. Wrapping this web on the belt 10 in the opposite helical direction to the initial wrap, with the original reinforcing layer facing outwards, permits a second reinforcing layer H, J to be applied across the original layer. If a 45° helix angle is used in both instances, the reinforcing layers will cross each other at 90° and will lie at 45° with respect to the product webs M, N.

Furthermore, although nonwoven fabric products would represent the major field of utility of the invention, the system is by no means so limited. For example, uniaxially oriented plastic sheets may be reinforced by bias laminating a second uniaxially oriented plastic sheet in the same manner as described for nonwoven fabric sheets. Similarly, one plastic sheet may be either reinforced with, or used as the reinforcement for, a nonwoven fabric sheet. Additionally, in lieu of sheet material, a plurality of threads may be either wrapped about the belt 10 or applied in lieu of the reinforcing webs H, J, embedding, in the latter case, the threads to an adhesive applied to the helically wrapped belt 10.

The sequence of web deposition may be reversed from that described previously. For example, the webs H and J may be deposited on the carrier belt 10 before applying the helically wrapped webs A and B. Webs H and J are then held temporarily on the belt by means such as electrostatic force or an adhesive pattern pre-printed on the carrier belt. By passage through the heaters 34 and the calender roll pairs 32 and 38, the assembled webs are bonded together for subsequent removal as a bias reinforced laminate, The adhesive, which is advanced by curing or drying, penetrates and bonds the webs and strips cleanly from the carrier belt. In some cases it may be desirable to use a polytetrafluoroethylene coated belt.

In another mode of operation, the takeoff platform 15 and web cutting device 20 are rotated and adjusted to slit and unwind the laminated webs along a different line than the initial angle of deposition. For example, at an initial angle of 45° and a removal angle of 22½° with respect to the belt axis, the completed laminate consists of crossed webs biased 22½° with respect to its long direction. However, when the removal angle is changed, the take-off platform 15 must be driven at a slower relative speed than the feed platform 14. Thus, the take-off platform must be either independently driven or suitably geared down if driven by the drive motor 17.

Further, different types of web material may be processed according to the invention. Thus, nonwoven fabrics of, for example, staple fibers may be combined with fabrics of monofilament fibers, or two staple-fiber or monofilament-fiber sheets of different fiber compositions may be laminated to each other.

Advantages of the invention, if not self-evident, are readily demonstrated upon inspection of the final product. The product webs, when carried out under optimal practice of the invention, have neither visible joints in the longitudinal direction nor overlapped areas in the base web. The reinforcing layers are generally so thin and so placed that any slight gaps or overlapped portions are unnoticeable.

With regard to the process, it operates with a minimum of down-time for roll changing, and the reinforcing webs H, J may be supplied from an initially endless source. Down-time may further be reduced by providing alternate supply roll positions, typified by the assembly shown in phantom 14 on FIG. 1, with one position being loaded and prepared for operation while the original rolls are running. Changeover time to the alternative supply roll is thus virtually eliminated.

Moreover, by providing a laminating system in which essentially all friction is eliminated, or else reduced to an insignificant level, neither the initial webs A, B nor the reinforcing webs H, J need be bonded or self-stabilized, or in other respects be rendered self-sustaining before use in the system of the invention. This feature or advantage reduces significantly the processing costs in the manufacture of nonwoven fabrics, in addition to diminishing process complexity. Not only is the system versatile in operation, capable of manufacturing different products in different manners, but it is readily integrated with other processing steps, for example printing, which may be applied to the web either during or subsequent to processing.

Thus it is apparent that there has been provided, in accordance with the invention, a process and apparatus that fully meet the aims, objectives, and advantages set forth earlier. While the invention has been described in conjunction with specific embodiments thereof, it is apparent that many alternatives, modifications, and variations will be evident to those skilled in the art in light of the foregoing description.

I claim as my invention:

1. A method of making bias reinforced material comprising the steps of:
   (a) helically wrapping a first component material about a generally flat portion of a continuously moving endless carrier belt;
   (b) applying a second component material over the first material on each side of the belt such that the second material is disposed substantially parallel to the direction of belt movement;
   (c) bonding the first and second materials together;
   (d) cutting the second material; and,
   (e) helically unwrapping the first material with the second material bonded thereto from the belt.

2. The method defined in claim 1 including the step of applying adhesive to the first material following the helical wrapping thereof and prior to the application of the second material.

3. The method defined in claim 2 including the step of heating the adhesive following the application thereof and prior to the application of the second material.

4. The method defined in claim 2 wherein the bonding of the first and second materials together includes the application of heat and pressure to cure the adhesive.

5. The method defined in claim 4 including the step of cooling the bonded material prior to cutting the second material.

6. The method defined in claim 1 including the step of unwinding the first material from a supply roll disposed for orbital movement around the belt prior to helically wrapping.

7. The method defined in claim 6 including the step of guiding the first material from its supply roll and onto the belt as the supply roll is orbited thereabout.

8. The method defined in claim 1 including the step of unwinding the first component material from a pair of supply rolls symmetrically disposed for orbital movement around the belt prior to helically wrapping.

9. The method defined in claim 1 including the additional step of winding up the unwrapped material on a take-up roll disposed for orbital movement around the belt.

10. The method defined in claim 9 including the further steps of replacing the supply roll with a substantially filled take-up roll and unwinding material therefrom and helically wrapping the material about the belt with the previously applied second material facing the belt and thereafter repeating steps (b–e) defined in claim 1.

11. The method defined in claim 8 including the additional step of winding up the unwrapped material on a pair of take-up rolls symmetrically disposed for orbital movement around the belt.

12. The method defined in claim 11 including the further steps of replacing the pair of supply rolls with a pair of substantially filled take-up rolls and unwinding material therefrom and helically wrapping the material about the belt with the previously applied second material facing the belt and thereafter repeating steps (b–e) defined in claim 1.

13. The method defined in claim 1 including the further step of longitudinally folding the first material with the second material disposed on the inside thereof after said unwinding step.

14. The method defined in claim 1 including the further step of longitudinally folding the first material with the second material disposed on the outside thereof after said unwinding step.

15. The method defined in claim 1 including the step of forming the second component material by drafting multiple slivers of textile fibers in a multiple roll draw frame on each side of the belt prior to step (b).

16. The method defined in claim 15 including the preliminary step of printing an open pattern of adhesive on the surface of the helically wrapped material on each side of the belt prior to step (b).

17. The method defined in claim 16 including the step of embedding the drafted fibers in the adhesive on each side of the belt.

18. The method defined in claim 17 wherein the bonding of the first and second materials together includes the application of heat and pressure to cure the adhesive.

19. Apparatus for making bias reinforced material comprising, in combination:
   means for helically wrapping a first component material about a generally flat portion of a continuously moving endless carrier belt,
   means for applying a second component material over the first material on each side of the belt with the second material disposed substantially in the direction of belt movement,
   means for bonding the first and second materials together,
   means for cutting the second material,
   and means for helically unwrapping the first material with the second material bonded thereto from the belt.

20. Apparatus as defined in claim 19 wherein the helical wrapping means includes a supply roll of the first material and a serving bar disposed for orbital movement about the belt.

21. Apparatus as defined in claim 19 wherein the unwrapping means includes a take-up roll and a guide bar disposed for orbital movement about the belt.

22. Apparatus as defined in claim 19 including means for applying adhesive to the surface of the helically wrapped first material on each side of the belt prior to the application of the second material.

23. Apparatus as defined in claim 22 wherein the means for applying the second material includes a multiple roll drafting frame disposed on each side of the belt for drafting multiple slivers of textile fibers into a lightweight fiber web.

24. Apparatus as defined in claim 23 including means for embedding the highly drafted fibers of each web in the adhesive applied on the surface of the first material.

25. Apparatus as defined in claim 22 wherein the bonding means includes a pair of calendar rolls and at least one heated roll for curing the adhesive.

References Cited

UNITED STATES PATENTS

| | | | |
|---|---|---|---|
| 1,604,273 | 10/1926 | Gammeter | 156—194 X |
| 1,504,255 | 8/1924 | MacDonald | 156—193 |
| 3,488,242 | 1/1970 | Berry | 156—195 X |
| 3,510,382 | 5/1970 | Wideman et al. | 156—425 |
| 3,533,882 | 10/1970 | Riese | 156—425 |
| 3,013,921 | 12/1961 | Jacobson | 156—193 X |
| 3,498,862 | 3/1970 | Comastri et al. | 156—195 |
| 3,533,883 | 10/1970 | Gartaganis et al. | 156—188 X |
| 3,157,545 | 11/1964 | Waldron et al. | 156—193 X |
| 3,383,261 | 5/1968 | Arnold | 156—194 X |
| 3,515,621 | 6/1970 | Watson. | |

CARL D. QUARFORTH, Primary Examiner

G. G. SOLYST, Assistant Examiner

U.S. Cl. X.R.

156—175, 190, 192, 193, 194, 195, 427, 432